Patented Sept. 19, 1944

2,358,402

UNITED STATES PATENT OFFICE 2,358,402

FUNGICIDAL PREPARATIONS

John L. Kurlychek, Orange, N. J., assignor to United States Rubber Company, New York, N. Y., a corporation of New Jersey No Drawing. Application September 9, 1943, Serial No. 501,675

10 Claims. (Cl. 167—33)

This invention relates to improvements in fungicidal preparations. The invention further relates to methods of protecting material subject to attack by microorganisms, more particularly to controlling mildew on fabric, leather and other materials, and to the immunizing of seed.

I have found that the reaction products of a 2-mercaptobenzothiazole with formaldehyde and a primary or secondary organic amine are effective fungicides. It is known that one mol each of a 2-mercaptobenzothiazole, formaldehyde and a primary or secondary amine interact with the elimination of one mol of water. The products derived from 2-mercaptobenzothiazoles with formaldehyde and primary amines may also be formed by first condensing formaldehyde with the primary amine and then effecting a simple addition reaction between the resulting methyleneimine and the mercaptobenzothiazole. The preparation of the compounds used as fungicidal preparations in the present invention, and their prior use as rubber vulcanization accelerators, are described in Coleman U. S. Patent 2,010,059 and Bunbury et al. British Patent 377,253. Ultraviolet absorption spectra show that the compounds are in the thio-keto form. The compounds are thus N-substituted 3-aminomethyl-2(3)-benzothiazolethiones. The structure of the compounds may be represented by the general formula

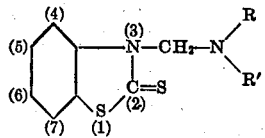

in which R represents an alkyl, aralkyl, aryl or cycloalkyl radical and R' represents hydrogen or an alkyl, aralkyl, aryl or cycloalkyl radical, or in which R and R' together represent alkylene or an alkylene containing a hetero atom in the chain. Said hetero atom may be, for example, oxygen, nitrogen, or sulfur. The benzo radical of the general formula may be substituted as with alkyl, alkoxy, halogen and nitro groups.

Among the mercaptobenzothiazoles which may be reacted with the amine and formaldehyde are 2-mercaptobenzothiazole, 2-mercaptotoluthiazole, 2-mercapto-6-nitrobenzothiazole, 2-mercapto-5-nitrobenzothiazole, 2-mercapto-6-chlorobenzothiazole, 2-mercapto-5-chlorobenzothiazole, 2-mercapto-6-ethoxybenzothiazole.

Examples of amines which may be reacted with the 2-mercaptobenzothiazole and formaldehyde to form the fungicides of the present invention are mono- or di- methylamine, mono- or di- ethylamine, mono- or di- propylamine, mono- or di- butylamine, mono- or di- amylamine, mono- or di- hexylamine, mono- or di- cyclohexylamine, piperidine, piperazine, morpholine, thiazane, mono- or di- benzylamine, aniline, diphenylamine, phenyl alpha-naphthylamine, phenyl beta-naphthylamine, mono- or di- tolylamine, mono- or di- ethanolamine, mono- or di- dodecylamine, cetylamine, octodecylamine, mono- or di- octylamine, furfurylamine, difurfurylamine.

The N-substituted 3-aminomethyl-2(3)-benzothiazolethiones may be applied in various ways to protect seeds or plants from attack by fungi. They may be applied as dust or sprays, diluted or undiluted, or mixed with a suitable liquid vehicle or with carriers. They may be applied with other fungicides, or with insecticides, insectifuges, fertilizers, hormones, buffering agents, or safening agents. They may be used as mildew-proofing agents by applying them to materials such as cotton fabrics and leather, and they may also be used to protect other materials such as rope, wood, glass, fur, hair, feathers, wool and paint, from attack by harmful microorganisms.

The following examples are given to illustrate the invention:

Example I

Pea seed, variety "Perfection," were tumbled with 1%, based on the seed weight, of various N-substituted 3-aminomethyl-2(3)-benzothiazolethiones in dust form, as shown in the table below. The seeds were then planted in soil known to be infested with a number of organisms, including *Pythium ultimum*. The effectiveness of the compounds as fungicides is shown by the number of seeds which germinated and developed into healthy plants compared with those which were untreated. The results were as follows:

| Compound | Percentage seed germination after 10 days | |
| --- | --- | --- |
| | Treated | Untreated |
| 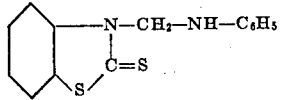 3-anilinomethyl-2(3)-benzothiazolethione | 79 | 38 |
| 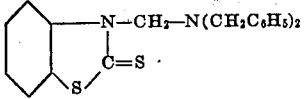 3-dibenzylaminomethyl-2(3)-benzothiazolethione | 74 | 25 |
| 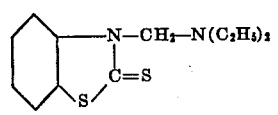 3-diethylaminomethyl-2(3)-benzothiazolethione | 78 | 19 |
| 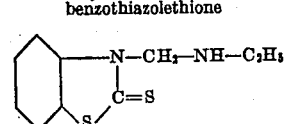 3-ethylaminomethyl-2(3)-benzothiazolethione | 38 | 24 |
| 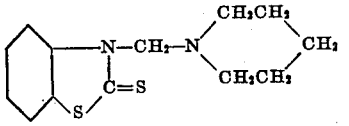 3-piperidinomethyl-2(3)-benzothiazolethione | 83 | 14 |

The above chemicals possess the advantage over 2-mercaptobenzothiazole, which has been disclosed in the patent literature as a fungicide, in that they are not irritating to the nose and throat.

Example II

This case illustrates the effectiveness of the compounds of the present invention for the control of fungi which attack textile materials, particularly cellulosic textiles, such as cotton. Of this type of fungus, the one which is highly destructive to cellulose and which has been set as the standard test organism is *Chaetomium globosum*. The fungicidal properties of the chemicals are shown by the following: A sample of dewaxed 8 oz. cotton duck was immersed in a 1% solution of 3-anilinomethyl-2(3)-benzothiazolethione in benzol, and dried to remove the solvent. The sample was then divided into two parts, one of which was inoculated with *Chaetomium globosum* spore suspension and incubated on agar nutrient. The other part was subjected to a 16-hour wash in running tap water, to determine extent of removal of chemical by leaching, then dried and inoculated and incubated as above. The incubation was carried out at room temperature in a dark place for 30 days. At the end of the incubation period it was found that no growth appeared on either section. On the other hand, similar samples of cotton duck which had not been treated with a fungicide, or merely treated by the solvent alone (benzol), and inoculated and incubated in the same manner and under the same conditions, showed a heavy growth of fungus within 5 days. The 3-anilinomethyl-2(3)-benzothiazolethione is much more resistant to leaching than is 2-mercaptobenzothiazole.

The N-substituted 3-aminomethyl-2(3)-benzothiazolethione may be applied to fabrics or yarns in any suitable manner, for example, in solution in organic solvents, as above described, or as aqueous suspensions which may be stabilized by the use of suitable surface active agents. For example, cotton fabrics have been rendered mildewproof by treatment with a 1% suspension of 3-anilinomethyl-2(3)-benzothiazolethione in water following the same technique as used above with the compound in a benzol solvent. The compounds of the invention may also be applied as oil-in-water emulsions in which the oil phase comprises a solution of the chemical in an oil such as cod oil, dibenzylamine, morpholine, and the like. For example, a suitable emulsion for mildewproofing cotton fabrics may be made by dissolving 10 parts by weight of 3-anilinomethyl-2(3)-benzothiazolethione in 90 parts of dibenzylamine, adding 2 parts by weight of a commercial dispersing agent, and thereafter emulsifying in sufficient water to produce an emulsion containing 1% by weight of the 3-anilinomethyl-2(3)-benzothiazolethione.

Example III

The mildewproofing properties of the compounds of the present invention are also shown by the results obtained on cotton fire hose jacket which has been subjected to a three weeks soil burial test. In this test the chemical must protect the cotton from various types of fungi as well as certain bacteria. The test consisted in burying in greenhouse soil a fire hose jacket which had previously been treated with a 3% aqueous suspension of 3-anilinomethyl-2(3)-benzothiazolethione, together with an untreated control. The tensile of the warp yarns of the original jacket prior to treatment and burial was 30 lbs. per sq. in. Upon being dug up after three weeks, the tensile of the warp yarns of the untreated control was only 4.5 lbs. per sq. in., a loss in strength of 85%, whereas the tensile of the warp yarns of the treated sample after the burial was 29.5 lbs. per sq. in., the loss of 1.6% being negligible. These results were the averages of ten tests. Other compounds, such as 3-dibenzylaminomethyl-2(3)-benzothiazolethione, and 3-ortho-toluinomethyl-2(3)-benzothiazolethione

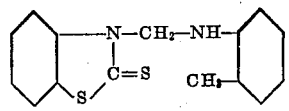

were shown by similar tests to be effective as mildewproofing agents for cotton.

Example IV

Leather has been rendered mildewproof by treating the surface with suitable dressings containing N-substituted 3-aminomethyl-2(3)-benzothiazolethiones. A formulation for such a dressing is as follows:

| | Parts by weight |
| --- | --- |
| 3-anilinomethyl-2(3)-benzothiazolethione | 30 |
| Zinc soap of coconut oil acids | 40 |
| Turpentine | 120 |

The above dressing also rendered the leather waterproof. The turpentine may be replaced by other solvents such as vegetable, mineral and animal oils. The leather can also be treated during the fat-liquoring operation. In this case the chemical is added to the fat-liquor oil, usually a cod oil, and drummed.

Having thus described my invention, what I claim and desire to protect by Letters Patent is:

1. The method of protecting material subject to attack by microorganisms which comprises applying to said material a liquid containing an N-substituted 3-aminomethyl-2(3)-benzothiazolethione.

2. The method of immunizing seed against attack by fungi which comprises treating said seed with an N-substituted 3-aminomethyl-2(3)-benzothiazolethione.

3. The method of immunizing seed against attack by fungi which comprises treating said seed with 3-anilinomethyl-2(3)-benzothiazolethione.

4. The method of controlling mildew on fabric containing cotton which comprises treating said fabric with an N-substituted 3-aminomethyl-2(3)-benzothiazolethione.

5. The method of controlling mildew on fabric containing cotton which comprises treating said fabric with 3-anilinomethyl-2(3)-benzothiozolethione.

6. The method of controlling mildew on fabric containing cotton which comprises treating said fabric with 3-dibenzylaminomethyl-2(3)-benzothiazolethione.

7. The method of controlling mildew on fabric containing cotton which comprises treating said fabric with 3-ortho-toluinomethyl-2(3)-benzothiazolethione.

8. The method of controlling fungi on cellulosic material which comprises treating said cellulosic material with an N-substituted 3-aminomethyl-2(3)-benzothiazolethione.

9. The method of controlling mildew on leather which comprises treating said leather with an N-substituted 3-aminomethyl-2(3)-benzothiazolethione.

10. The method of controlling mildew on leather which comprises treating said leather with 3-anilinomethyl-2(3)-benzothiazolethione.

JOHN L. KURLYCHEK.